United States Patent [19]
Kondo

[11] Patent Number: 5,561,644
[45] Date of Patent: Oct. 1, 1996

[54] SHORT SEEKING TIME OPTICAL DISC APPARATUS

[75] Inventor: Masamichi Kondo, Tokyo, Japan

[73] Assignee: Sony Corporation, Tokyo, Japan

[21] Appl. No.: 318,817

[22] Filed: Feb. 21, 1995

[30] Foreign Application Priority Data

Feb. 22, 1993 [JP] Japan .................................. 5-056525

[51] Int. Cl.[6] ............................................ G11B 7/00
[52] U.S. Cl. .............................. 369/32; 369/33; 369/47; 369/48; 369/50; 369/54
[58] Field of Search ............................ 369/32, 33, 47, 369/48, 50, 54

[56] References Cited

U.S. PATENT DOCUMENTS

| | | | |
|---|---|---|---|
| 4,866,695 | 9/1989 | Suzuki et al. | 369/266 |
| 5,093,820 | 3/1992 | Maeda et al. | 369/50 |
| 5,109,369 | 4/1992 | Maeda et al. | 369/50 |
| 5,343,452 | 8/1994 | Maeda et al. | 369/32 |

FOREIGN PATENT DOCUMENTS 6379275 4/1988 Japan .

Primary Examiner—Georgia Y. Epps
Attorney, Agent, or Firm—Limbach & Limbach

[57] ABSTRACT

In an optical disk apparatus for recording and/or reproducing a predetermined data on/from a disk recording medium rotated by constant linear velocity (CLV) system, at seek operation for moving the optical pickup to the target position of the disk recording medium, the rotational speed of the rotational driving means is controlled based on the first rotational speed signal of rotational driving means first, and when it is detected by the output of position detecting means that the optical pickup moves to the target position, the rotational speed of rotational driving means is controlled based on the second rotational speed signal obtained from the disk recording medium, so that the disk recording medium can be rotated, based on the second rotational speed signal, immediately after the termination of seek operation. Therefore, the optical disk apparatus which can shorten the time necessary for seek can be realized.

6 Claims, 8 Drawing Sheets

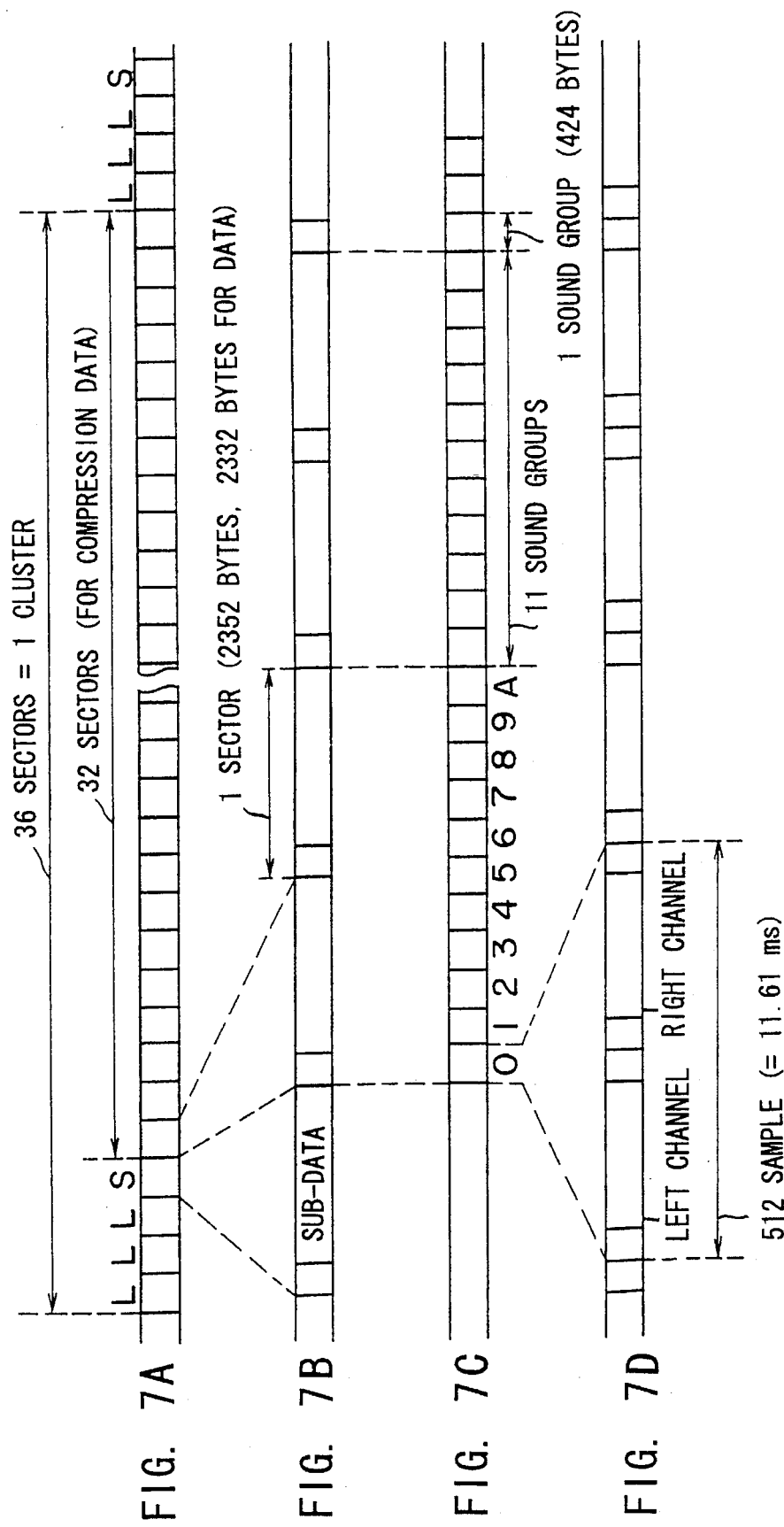

| | 16 BIT EVEN M | | 16 BIT ODD M | |
|---|---|---|---|---|
| | MSB WmB LSB | MSB WmA LSB | MSB WmB LSB | MSB WmA LSB |
| | d1        d8 | d1        d8 | d1        d8 | d1        d8 |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000010 |
| 4 | 00000000 | 00000000 | 00000000 | 00000000 |
| 5 | 00000000 | 00000000 | 00000000 | 00000000 |
| 6 | "M" | "I" | "N" | "I" |
| 7 | Disc type | Rec power | First TNO | Last TNO |
| 8 | Read-out start address | | | Used Sectors |
| 9 | Power cal area start address | | | 00000000 |
| 10 | U-TOC start address | | | 00000000 |
| 11 | Recordable user area start address | | | 00000000 |
| 12 | 00000000 | P-TNO 1 | P-TNO 2 | P-TNO 3 |
| 13 | P-TNO 4 | P-TNO 5 | P-TNO 6 | P-TNO 7 |
| 75 | P-TNO 252 | P-TNO 253 | P-TNO 254 | P-TNO 255 |
| 76 | 00000000 | 00000000 | 00000000 | 00000000 |
| 77 | 00000000 | 00000000 | 00000000 | 00000000 |
| 78 | Start address (track 1) | | | Track mode |
| 79 | End address | | | 00000000 |
| 80 | Start address (track 2) | | | Track mode |
| 586 | Start address (track 255) | | | Track mode |
| 587 | End address | | | 00000000 |

Rows 0–3: HEADER
Rows 4–587: DATA AREA (2336 BYTES)

FIG. 8

|  | 16 BIT EVEN M | | | | 16 BIT ODD M | | | |
|---|---|---|---|---|---|---|---|---|
|  | MSB WmB LSB | | MSB WmA LSB | | MSB WmB LSB | | MSB WmA LSB | |
|  | d1 | d8 | d1 | d8 | d1 | d8 | d1 | d8 |
| 0 | 00000000 | | 11111111 | | 11111111 | | 11111111 | |
| 1 | 11111111 | | 11111111 | | 11111111 | | 11111111 | |
| 2 | 11111111 | | 11111111 | | 11111111 | | 00000000 | |
| 3 | cluster H | | cluster L | | 00000000 | | 00000010 | |
| 4 | 00000000 | | 00000000 | | 00000000 | | 00000000 | |
| 5 | 00000000 | | 00000000 | | 00000000 | | 00000000 | |
| 6 | 00000000 | | 00000000 | | 00000000 | | 00000000 | |
| 7 | Maker code | | Model code | | First TNO | | Last TNO | |
| 8 | 00000000 | | 00000000 | | 00000000 | | Used Sectors | |
| 9 | 00000000 | | 00000000 | | 00000000 | | 00000000 | |
| 10 | 00000000 | | 00000000 | | 00000000 | | Disc Serial NO | |
| 11 | DISC · ID | | | | P-DFA | | P-EMPTY | |
| 12 | P-FRA | | P-TNO 1 | | P-TNO 2 | | P-TNO 3 | |
| 13 | P-TNO 4 | | P-TNO 5 | | P-TNO 6 | | P-TNO 7 | |
| ... | | | | | | | | |
| 74 | P-TNO 248 | | P-TNO 249 | | P-TNO 250 | | P-TNO 251 | |
| 75 | P-TNO 252 | | P-TNO 253 | | P-TNO 254 | | P-TNO 255 | |
| 76 | 00000000 | | 00000000 | | 00000000 | | 00000000 | |
| 77 | 00000000 | | 00000000 | | 00000000 | | 00000000 | |
| 78 | Start address | | | | | | Track mode | |
| 79 | End address | | | | | | Link-P | |
| ... | | | | | | | | |
| 586 | Start address | | | | | | Track mode | |
| 587 | End address | | | | | | Link-P | |

Rows 0–3: HEADER. Rows 0–587: DATA AREA (2336 BYTES).

SHORT SEEKING TIME OPTICAL DISC APPARATUS

TECHNICAL FIELD

This invention relates to an optical disk apparatus, and more particularly, is applicable to an apparatus for recording and/or reproducing predetermined data on/from an optical disk being rotated by constant linear velocity (CLV) system.

BACKGROUND ART

Conventionally, an optical disk apparatus using CLV system differs in the rotational speed of optical disk depending on the position of an optical pickup in radial direction on the optical disk, so that it is needed to change the rotational speed of a spindle motor at seeking.

Therefore, a conventional optical disk apparatus rotates an optical disk based on the speed information obtained by reproducing data on recording tracks, stops servo control of a spindle motor and tracking control at seeking, thereafter, moves an optical pickup to the target position, and then resumes the tracking control and the servo control of the spindle motor.

The above method has been used because the signal that is a criterion of the rotational speed servo of optical disk is obtained from the reproduction signal of the optical disk. More specifically, since the optical pickup traverses helically the tracks of the optical disk at seeking, the accurate servo information can not be obtained.

Here, if the seeking distance becomes longer, it is necessary to significantly change the rotational speed of spindle motor. In the above method, there has been a problem that because the servo control of spindle motor starts after the optical pickup is moved, the time from the arrival of the command for seeking to the reading and writing of data after starting all servo becomes longer.

DISCLOSURE OF INVENTION

The object of this invention is to solve the above problem and to provide an optical disk apparatus in which the time for seeking is as short as possible.

To solve the above problem, this invention provides an optical disk apparatus 1 for recording and/or reproducing a desired data by rotationally driving a disk recording medium 2 under constant linear velocity, comprising: rotational driving means 4 and 5 for rotationally driving the disk recording medium 2, and detecting the rotational speed of the disk recording medium 2 to output a first rotational speed signal FG; optical pickup means 8 for irradiating a light beam to the disk recording medium 2 to record and/or reproduce the data on/from the disk recording medium 2; means for moving optical pickup 7 for moving the optical pickup means 8 in the radial direction of the disk recording medium 2; rotational speed information detecting means 10 for detecting the rotational speed of the disk recording medium 2 based on the data reproduced by the optical pickup means 8, and outputting a second rotational speed information FS; servo switching means 18 for selectively supplying the first rotational speed signal FG and the second rotational speed information FS to the rotational driving means 4 and 5; position detecting means 23 for detecting the position in the radial direction of the disk recording medium 2 of the optical pickup means 8; and control means 3 for switching the servo switching means 18 at seeking operation to control the rotational speed of the rotational driving means 4 and 5 based on the first rotational speed signal FG, and when it is detected that the optical pickup means 8 have been moved to the target position by the output of the position detecting means 23, switching the servo switching means 18 to control the rotational speed of the rotational driving means 4 and 5 based on the second rotational speed signal FS.

At seeking, the optical pickup 8 is moved to the target position on the disk recording medium 2, when the servo switching means 18 is switched to control the rotational speed of the rotational driving means 4 and 5 based on the first rotational speed signal FG, and it is detected that the optical pickup 8 is moved to the target position by the output of the position detecting means 23, the servo switching means 18 is switched to control the rotational speed of the rotational driving means 4 and 5 based on the second rotational speed signal FS. Therefore, the disk recording medium 2 can be rotated immediately after seeking operation based on the second rotational speed signal FS, so that the time necessary for seeking can be shortened.

BRIEF DESCRIPTION OF DRAWINGS

FIGS. 7A to 7D are schematic diagrams explaining the structure of audio data to be processed by the magneto-optical disk apparatus;

FIG. 8 is a table explaining the sector 0 of TOC formed in the read-in area of optical disk or magneto-optical disk; and FIG. 9 is a table explaining the sector 0 of UTOC formed in the recordable area of magneto-optical disk.

BEST MODE FOR CARRYING OUT THE INVENTION

Preferred embodiments of this invention will be described with reference to the accompanying drawings:

(1) Format of optical disk

Figure 5:
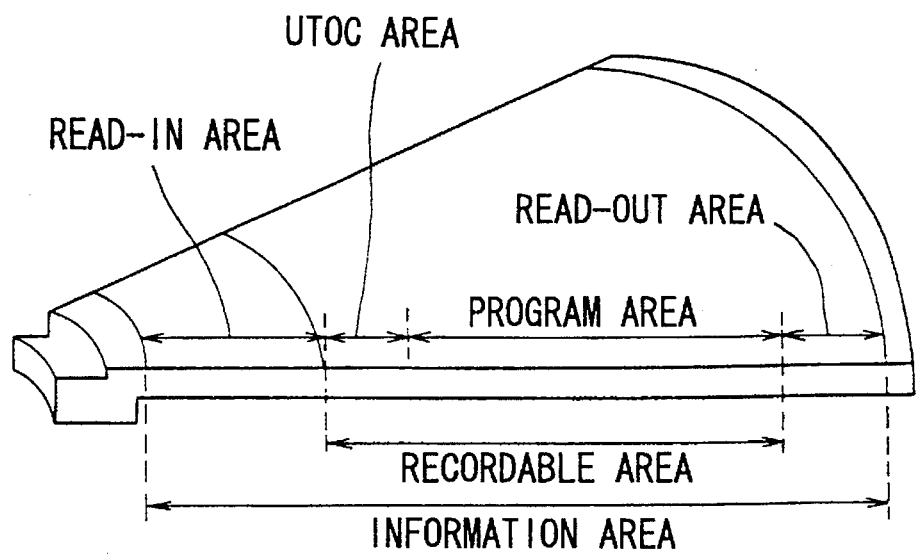
FIG. 5 is a schematic perspective view explaining a recordable and reproducible magneto-optical disk.

There has been provided a mini disk apparatus, etc. as an optical disk apparatus being applied in this invention. In the optical disk apparatus, continuous audio data is recorded by a predetermined block unit, so that the audio data can be discretely recorded in a magneto-optical disk. That is, as shown in FIG. 5, a magnetic film is formed on the recordable and/or reproducible magneto-optical disk having a diameter of 64 [mm] so that the desired data can be recorded and/or reproduced by applying the method for thermomagnetic recording. A read-in area is formed at the innermost of an information area which is a data recording area, and TOC (Table of Contents) data consisting of management data is recorded in the read-in area.

Figure 6:
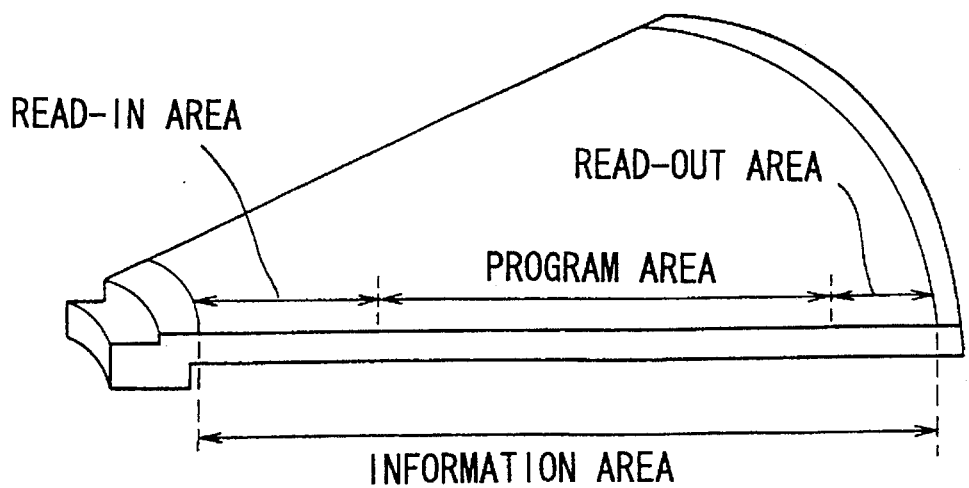
FIG. 6 is a schematic perspective view explaining an optical disk for reproduction only.

Further, in the optical disk apparatus, as shown in FIG. 6, it is possible to reproduce an optical disk for reproduction only in which the desired data has been recorded by applying the same method as a compact disk, in addition to the recordable and/or reproducible magneto-optical disk. Type of disk is distinguished by the TOC data. Also, as a magneto-optical disk, there is a composite type of magneto-optical disk in which both of area for reproduction only and recordable and reproducible area are formed, and type of disk is also distinguished by the TOC data.

A management data of audio data recorded in the area for reproduction only is recorded in the TOC data, so that the optical disk apparatus can perform the processing such as finding the head of a music performance and the selection of music based on the management data. A read-out area is formed at the outermost of the information area to detect the end of the information area.

Further, a recordable area which is recordable and reproducible is formed between the read-in area and the read-out area in the recordable and/or reproducible magneto-optical disk, and UTOC (User Table of Contents) area is formed at the innermost of the recordable area. The management data of audio data recorded in the following program area is recorded in the UTOC area. Here, in the optical disk apparatus, when audio data is recorded, the UTOC area is updated, and the processing such as finding the head of a music performance and selection of music is performed in next reproduction based on the updated UTOC data, and then a recordable empty area is detected to record the audio data.

As shown in FIGS. 7(A) to 7(D), the audio data to be recorded in the information area is analog-to-digital converted and is inputted to a volume compression and expansion circuit to be divided into blocks at a predetermined cycle. The blocked data is further volume compressed for each block (hereinafter, the block of volume compressed data is referred to as "sound group" (FIG. 7(D)). Further, two sectors (FIGS. 7(B) and 7(C)) are formed by successive eleven sound groups, and furthermore, one cluster (FIG. 7(A)) is formed by thirty-six sectors.

The first four sectors are assigned to link sectors for connecting between clusters, and sub-data is recorded in the last sector of the link sectors. The optical disk apparatus uses the link sectors to cross-interleave process per cluster and to error correcting process (that is consisted of CIRC (Cross Interleaved Reed-Solomon Code)), so that the audio data can be recorded and/or reproduced in each cluster.

When the audio data is recorded and/or reproduced, the optical disk apparatus records and/or reproduces the audio data via a memory circuit having a large capacity. The audio data is inputted or outputted at the data transfer rate of 1.4 [Mbit/sec] between the memory circuit and the optical disk, and meanwhile, inputted or outputted at the data transfer rate of 0.3 [Mbit/sec] between the memory circuit and the volume compression and expansion circuit.

Further, when the audio data is inputted or outputted between the memory circuit and the optical disk, the optical disk apparatus inputs or outputs the data per cluster, and if track jump occurs due to a vibration, etc., stops the recording and/or reproducing operation, returns to the earlier recording and/or reproducing position, and resumes the recording and/or reproducing of audio data again at the position where the track jump has been occurred. Therefore, the optical disk apparatus uses the memory circuit having a large capacity as a buffer memory, switches the transfer rate to record and/or reproduce the audio data, and record and/or reproduce the audio data in each cluster, so as to prevent from the sound jump, etc.

The TOC data is recorded per sector similar to the audio data recorded and/or reproduced in the above way, as shown in the table of FIG. 8, data of 2,352 bytes is allocated to each sector. Among this, the area denoted by address in the vertical direction "0" to "3" is allocated to the header, 12 bytes of the address in the vertical direction "0" to "2" is allocated to synchronization pattern and the first and second bytes of the successive address in the vertical direction "3" are allocated to the address of cluster.

In the TOC of sector "0", a main data area having 2,336 bytes is formed following the header, and the data of "00h" is successively allocated to the first 8 bytes of the area. Next, the character code (that is consisted of the character code "MINI") representing a disk for audio is recorded with ASCII code. Further, in the TOC of sector "0", an identification data (Disc type) representing type of disk is allocated next, so as to distinguish type of disk, an optical disk for reproduction only, a recordable and reproducible magneto-optical disk, and a composite type of magneto-optical disk, and then the data of the quantity of light (Rec power) necessary for recording is recorded.

Furthermore, in the TOC of sector "0", successively from the vertical direction address "8", a start address of read-out area (Read-out start address), a start address of area for adjusting the quantity of light necessary for recording (Power calibration area start address), a start address of UTOC (U-TOC start address), and a start address of data area (Recordable user start address) are recorded. Next, in the TOC of sector "0", in case of an optical disk for reproduction only and a composite type of magneto-optical disk, pointers of logical tracks formed in the area for reproduction only (P-TNO1, . . . , P-TNO225), a start address (Start address) and end address (End address) of logical track specified by each pointer (P-TNO1, . . . , P-TNO255) are recorded.

Here, in case of an optical disk, one recording track is formed spirally from inside toward outside of the information area, and the one track is divided to form the logical tracks. In the disk for audio data, in case of the optical disk for reproduction only, the logical track is generally formed to correspond to each music performance, and each logical track is specified by pointer.

Meanwhile, the recording start position and recording end position regarding corresponding logical track are designated to the start address (Start address) and the end address (End address) based on cluster, sector, and sound group. For example, first music performance is prescribed by the pointer P-TNO 1 specifying a first track number, and the actual recording position is prescribed by the start address (Start address) and the end address (End address) of the address in the vertical direction specified by the pointer P-TNO 1. Therefore, the optical disk apparatus can find the head of desired music performance, etc. by referring to the TOC data for the area for reproduction only.

On the contrary, a recordable and reproducible magneto-optical disk and a composite magneto-optical disk are formed with UTOC data, as shown in FIG. 9, in the UTOC area. The management data is prescribed per sector in the UTOC data, and the header is formed first similar to TOC. Then, in UTOC data of sector "0", the address of cluster and the data of "00h" are recorded, a predetermined code data (Maker code, Model code) is allocated, and thereafter, start track number (First TNO), end track number (Last TNO) of the program area, and so on are allocated.

Among the UTOC data of sector "0", the identification data of 2 bytes for identifying disk type is recorded in the address "11" in the vertical direction, and then pointer (P-DFA) representing the position of defect area in the main data recording area and pointer (P-EMPTY) representing the head position of empty recording area in the main data recording area are allocated to the address "11". Further, to the following address "12" in the vertical direction, pointer (P-FRA) representing the head position of each audio data recorded in the program area is allocated. Then, pointers (P-TNO1, . . . , P-TNO255) representing the starting position for recording each audio data are successively allocated next.

Further, after the pointers (P-TNO1, . . . , P-TNO255), a pair of start address (Start address) and end address (End address) is respectively allocated, and link pointer (Link-P) representing the connecting relation regarding the recording unit prescribed by the start address (Start address) and the end address (End address) is allocated.

Hence, in the optical disk apparatus for recording and/or reproducing audio signal, regarding the first recording unit of each music performance, the data of the recording unit of corresponding start address (Start address) and end address (End address) is reproduced by the pointers (P-FRA, P-TNO1, . . . , P-TNO255), thereafter, if the link pointer (Link-P) is set following the end address (End address), the data of recording unit of the start address (Start address) and the end address (End address) specified by the link pointer (Link-P) is reproduced.

On the contrary, in recording, in the optical disk apparatus, audio data is recorded to the start address (Start address) and the end address (End address) specified by the pointer (P-EMPTY) representing the head position of empty recording area, thereafter, the start address (Start address) and end address (End address) in a following recordable area are successively detected by the link pointer (Link-P) following the end address (End address). Therefore, in the optical disk apparatus, the successive music performance can be discretely recorded in the recordable and reproducible area formed on the magneto-optical disk discretely by repeating recording and deleting, and the music performance recorded discretely in this way can be surely reproduced.

Therefore, when a magneto-optical disk is inserted or the power is turned on, the optical disk apparatus moves the optical pickup to the read-in area at first to reproduce TOC, thereafter, reproduces UTOC if necessary, so that the management data of program area is reproduced first. Then, the optical disk apparatus stores the management data reproduced in the above way in the specified memory circuit and holds the data, and holds the optical pickup in the innermost of program area and waits. Here, if the button for starting reproduction is operated, the audio data is successively reproduced based on the management data stored in the memory circuit.

Figure 1:
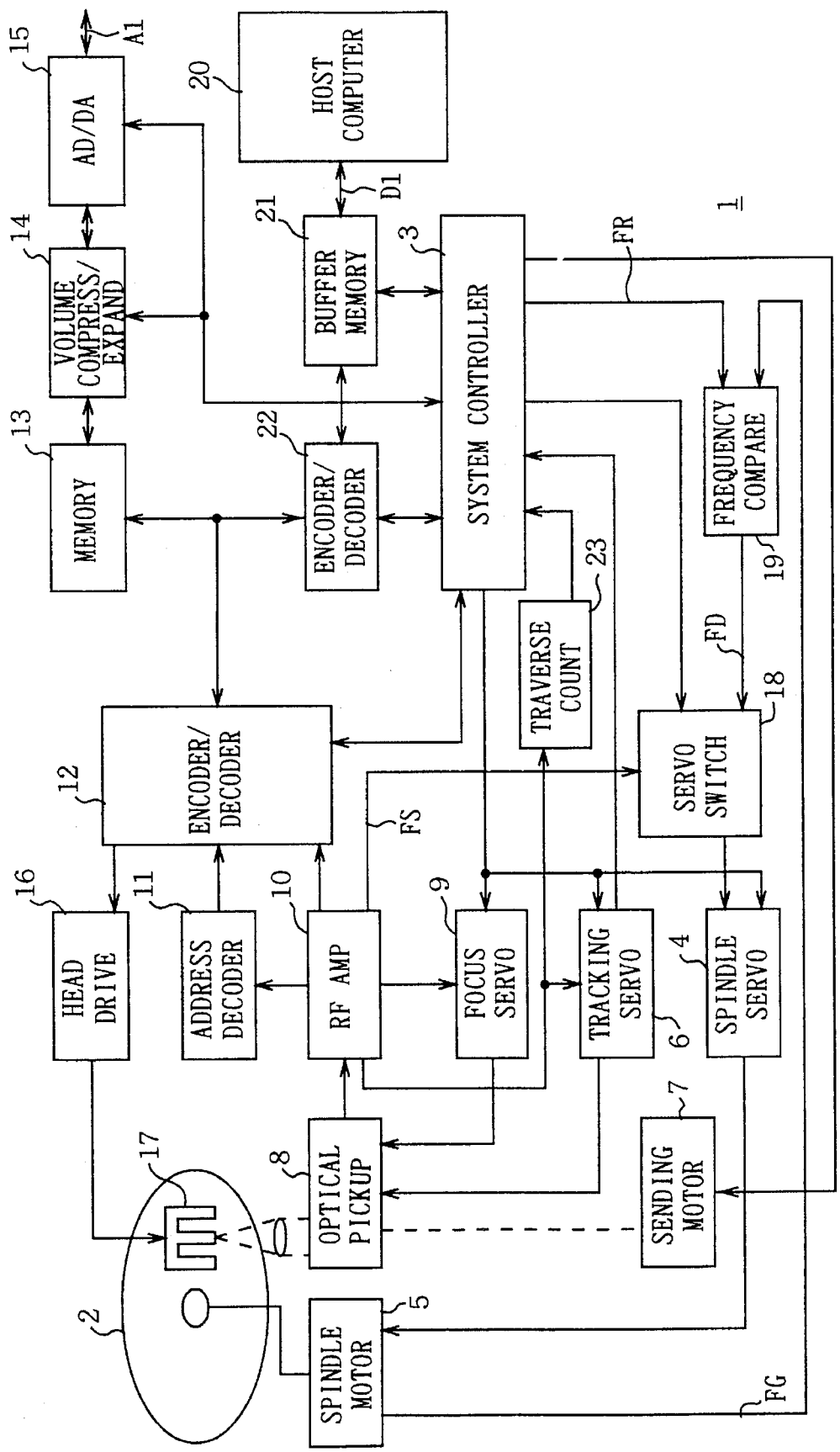
FIG. 1 is a block diagram showing the construction of the first embodiment of an optical disk apparatus according to this invention.

(2) Optical disk apparatus according to first embodiment (2-1) Whole construction In FIG. 1, 1 generally shows an optical disk apparatus. When a disk 2 is loaded in the optical disk apparatus 1, TOC data is read from a read area in the disk 2, and then UTOC data is read from UTOC area if necessary. Further, when the disk 2 is loaded in the optical disk apparatus 1, control command is outputted from a system controller 3 to a spindle servo circuit 4. Thus, the spindle servo circuit 4 drives the spindle motor 5 to rotate the disk 2 at a predetermined rotational speed.

Next, the system controller 3 outputs control command to a tracking servo circuit 6, thereby driving a sending motor 7 to move an optical pickup 8 to the read-in area of the disk 2. In the optical disk apparatus 1, the optical pickup 8 is moved as described above, thereafter, control command is outputted from the system controller 3 to a focus servo circuit 9 and the tracking servo circuit 6, to drive the optical pickup 8, and then optical beam is irradiated to the disk 2. The optical pickup 8 receives a reflection light obtained from the disk 2 in this state.

An RF amplifier 10 generates focus error signal based on the output signal of the optical pickup 8, and outputs the focus error signal to the focus servo circuit 9. Therefore, the optical disk apparatus 1 can achieve focusing control. Moreover, the RF amplifier 10 generates tracking error signal from the output signal of optical pickup 8. The tracking error signal is outputted to the tracking servo circuit 6. Therefore, the optical disk apparatus 1 can achieve tracking control of the optical pickup 8. Furthermore, the output signal of optical pickup 8 is amplified and binarized by the RF amplifier 10 to output to an address decoder 11. The address decoder 11 detects the position information of the irradiating position of light beam.

Here, if the disk 2 is a recordable and reproducible magneto-optical disk, the wobbling pre-groove is previously formed in a recordable area. Thus, the level of the output signal of optical pickup 8 changes following the wobbling of pre-groove. Therefore, in the optical disk apparatus 1, the center frequency of the changing signal level of the output signal from the optical pickup 8 is detected, to detect the rotational speed information of the magneto-optical disk 2. The spindle motor 5 is driven so that the frequency becomes 22.05 [KHz], thereby controlling to rotate the magneto-optical disk 2 under prescribed constant linear velocity. Moreover, in the optical disk apparatus 1, the center frequency of the changing level of the output signal from the optical pickup 8 is set to 22.05 [KHz], and the frequency transition from the center frequency is detected by applying the FM demodulation method, thereby, detecting the position information of the light beam irradiating position.

On the contrary, in the area for reproduction only, data is recorded by forming pits. Hence, if the spindle motor 5 is driven so that the level of the output signal from the optical pickup 8 changes at the basic frequency of 4.3218 [MHz], the optical disk 2 can be rotationally driven under prescribed constant linear velocity, and moreover, the reproduction position information can be detected based on the reproduced result.

The address decoder 11 detects the position information of the light beam irradiating position based on the detection principle. The detected position information is outputted to the system controller 3 via an encoder/decoder 12. Thereby, the optical disk apparatus 1 can record data in a desired track based on the position information and can reproduce data from a desired recording track.

The RF amplifier 10 detects the rotational speed information FS based on the output signal of optical pickup 8. The rotational speed information FS is supplied to the spindle servo circuit 4 via a servo switching circuit 18. Therefore, the optical disk apparatus 1 can drive the optical disk 2 under prescribed constant linear velocity.

Here, the encoder/decoder 12 switches the operation between the recording mode and the reproduction mode. The encoder/decoder 12, in reproduction mode, demodulates successively the output signal of RF amplifier 10 to obtain demodulation data, and the demodulation data is error correction processed and deinterleave processed. The error correction processing is performed based on CIRC error correction code which is added to reproduction data, etc. and is recorded. Thus, the optical disk apparatus 1, in recording, records the data to which the error correction code is added. TOC data reproduced from TOC area is stored in a memory circuit 13 comprising random access memory.

The system controller 3 judges type of disk 2 in accordance with the identification data added to the TOC data. In case that the disk 2 is a magneto-optical disk, the system controller 3 outputs control command to the tracking servo circuit 6 and the spindle servo circuit 4 to access UTOC area, and reproduces UTOC data to store in the memory circuit 13. More specifically, the optical disk apparatus 1 previously reproduces TOC data and UTOC data which consist of management data of data recorded in the program area and stores them in the memory circuit 13, thereafter, a desired data is reproduced from the program area or a desired data is recorded in the program area, on the basis of the TOC data and UTOC data.

In case that the loaded disk 2 is a magneto-optical disk for audio, the system controller 3 switches the whole operation mode to recording/reproducing mode of audio data, and switches a volume compression and expansion circuit 14 and an analog-to-digital/digital-to-analog converting circuit (AD/DA) 15 to operation state. When user sets the recording mode in this state, the analog-to-digital/digital-to-analog converting circuit (AD/DA) 15 converts successively inputted audio signal A1 into digital signal having sampling frequency of 44.1 [KHz] and quantizing bit number of 16 bits. The volume compression and expansion circuit 14 performs volume compression processing on the digital signal per predetermined cycle to form sound group. Modified discrete cosine transform (Modified DCT) is applied to the volume compression.

The memory circuit 13 has the capacity that is possible to store audio data for three seconds at its maximum if it is converted into audio signal A1. The memory circuit 13 stores once audio data supplied from the volume compression and expansion circuit 14, and successively outputs them to the encoder/decoder 12 per cluster. The encoder/decoder 12 performs interleave processing on the audio data and adds error correction code to the audio data, and then modulates the audio data with the modulation method which is applicable to the recording of the optical disk (that is, EFM modulation). The recording data obtained as a result is outputted to a head driving circuit 16.

At this time, the system controller 3 drives the sending motor 7 based on the UTOC data previously detected, so as to move the optical pickup 8 and a magnetic head 17 to an empty recording area. Then, the optical disk apparatus 1 drives the head driving circuit 16 and the magnetic head 17 in accordance with the recording data and the modulation magnetic field formed by the magnetic head 17 is impressed to the magneto-optical disk 2. In the optical disk apparatus 1, the light beam is intermittently irradiated to the impressing position of the modulation magnetic field by the optical pickup 8, so as to record the audio data.

The reflection light of light beam is detected by the optical pickup 8, and the detected result is supplied to the address decoder 11 via the RF amplifier 10. As a result, the address decoder 11 detects the position information of each recording area. Therefore, the optical disk apparatus 1 can successively record audio data in the desired recording area based on the position information detected result.

At the recording, the encoder/decoder 12 adds header to the audio data of sound group to form sectors, and a cluster is formed by the sectors. Thus, the audio data is recorded per cluster. UTOC data in the memory circuit 13 is updated whenever the audio data is recorded. When the magneto-optical disk 2 is ejected or when the power supply is cut off, UTOC area of magneto-optical disk 2 is updated with the updated UTOC data. Therefore, in the optical disk apparatus 1, UTOC area is updated in response to the operation of elimination of record in the magneto-optical disk 2, and the management data of recordable area can be recorded certainly.

On the contrary, in reproduction mode of audio data, the optical disk apparatus 1 makes the quantity of light of the light beam outputted from the optical pickup 8 low power. Then, in the optical disk apparatus 1, the change on the plane of polarization of the reflection light obtained from the magneto-optical disk 2 is detected, so that the recording data in the magneto-optical disk 2 is reproduced by using Kerr effective. The output signal of RF amplifier 10 is demodulated and error correction processed at the encoder/decoder 12, etc., and is outputted to the memory circuit 13.

Here, the optical disk apparatus 1 uses the memory circuit 13 as a buffer memory as the same as in recording, outputs the reproduced audio data to the volume compression and expansion circuit 14, and performs volume expansion processing. The optical disk apparatus 1 demodulates audio data to digital audio signal at the volume compression and expansion circuit 14, thereafter, outputs them with the form of analog signal A1 via the analog-to-digital/digital-to-analog converting circuit 15.

Here, if the optical disk apparatus 1 is connected as the outer storage device of host computer 20, the output data D1 of host computer 20 is stored in the buffer memory 21 via the SCSI interface. At this time, in the system controller 3, write command corresponding to the output data D1 is inputted from the host computer 20 via the buffer memory 21. The system controller 3 detects a recordable area with reference to UTOC data in response to the write command, and moves the optical pickup 8 and the magnetic head 17 to the recordable area.

The encoder/decoder 22 divides the output data D1 into blocks with a predetermined unit, and adds the error correction code to the blocked data. The data D1 to which the error correction code is added is successively supplied to the memory circuit 13 in each data corresponding to the sector of audio data. Therefore, the optical disk apparatus 1 outputs the data from the memory circuit 13 to the encoder/decoder 12 as the same as in recording of audio data. The encoder/decoder 12 performs interleave processing and error correction code generating processing on the data per cluster and converts them into recording data. In the system controller 3, UTOC data of the memory circuit 13 is updated as the same as in recording of audio data, and UTOC area of the magneto-optical disk 2 is updated with the updated UTOC data.

On the contrary, if data recorded as described above is reproduced, the encoder/decoder 12 performs error correction processing and deinterleave processing on the reproduction data per cluster with the same operation as in reproduction of audio data, to supply the data to the memory circuit 13. The encoder/decoder 22 error correction processes the reproduction data stored in the memory circuit, on the contrary to in recording, and outputs them. At this time, the system controller 3 retrieves UTOC data of the memory circuit 13 in response to the command outputted from the host computer 20, so that the recording position of data specified by the host computer 20 is detected to reproduce the magneto-optical disk 2. The buffer memory 21 stores the output data of the encoder/decoder 22, and also outputs the stored data in response to the operation of the host computer 20.

(2-2) Control of spindle servo at standing by

In case that the data D1 is recorded and reproduced as the outer storage device of the host computer 20, the optical disk apparatus 1 holds the optical pickup 8 at the predetermined position while standing by, so as to shorten access time.

That is, the servo switching circuit 18 and the spindle servo circuit 4 compare the phase between the predetermined reference signals, based on the signal of basic frequency on the basis of the pre-groove outputted from the RF amplifier 10 or the rotational speed information FS on the basis of the signal of the basic frequency of pit forming cycle so that these frequencies become 22.05 [kHz] and 4.3218 [MHz] respectively, and then, drives the spindle motor 5 in accordance with the phase difference obtained from compared result. Therefore, the optical disk apparatus 1 drives the optical disk 2 under constant linear velocity, in recording and reproducing of data, based on the rotational speed information FS obtained from the optical disk 2.

On the contrary, the system controller 3 judges that it is the state of standing by, excepting when the data is practically recorded and reproduced to switch the output of the servo switching circuit 18. The system controller 3 controls the tracking servo circuit 6 at standing by state, stops the tracking control of the optical pickup 8 at the position where the optical disk 2 is accessed last, and holds the optical pickup 8 at the position where the optical disk 2 is accessed last. Simultaneously, the system controller 3 controls to stop the focus servo circuit 9, and stops the irradiation of light beam. Thereby, the whole consumption power is reduced, the generation of heat is reduced and the life time of a laser diode of the optical pickup 8 irradiating a light beam is extended.

The spindle motor 5 generates the rotational frequency signal FG that the signal level becomes high whenever it rotates by the predetermined angle. The rotational frequency signal FG is supplied to a frequency comparing circuit 19 to compare in its frequency with the reference clock signal FR supplied from the system controller 3. The frequency difference signal FD outputted from the frequency comparing circuit 19 is supplied to the spindle servo circuit 4 via the servo switching circuit 18. As a result, the spindle servo circuit 4 controls the rotation of the spindle motor 5 in accordance with the frequency difference signal FD. The frequency of the rotational frequency signal FR is controlled stepwise depending on the position in the radial direction of the target track. This is easily realized by selectively outputting the reference clock of a plural frequency from a frequency demultiplier provided in the system controller 3.

Thus, the optical disk apparatus 1 holds the optical pickup 8 at the position where the disk is accessed last, and rotationally drives the optical disk 2 at the rotational speed corresponding to the held position, so as to, in recording and reproducing of successive data, switch the control reference of the spindle motor 5 from the frequency difference signal FD to the rotational speed information FS to rise to the desired rotational speed in short time. Therefore, the successive data can be accessed in short waiting time, at next access time. Further, in the embodiment, the system controller 3 outputs control command to the spindle servo circuit 4 when the waiting time exceeds the predetermined time, to control to stop the rotation of the spindle motor 5. Thus, the whole power consumption is reduced.

Until the rotation of the spindle motor 5 is stopped after the access is terminated, the system controller 3 judges the specification whether or not to stop the tracking control, the specification whether or not to suspend the irradiation of light beam, etc., by setting parameter and outputting command from the host computer 20. Therefore, the control at standing by state can be switched freely in accordance with the processing of the host computer 20, so as to improve the usability.

(2-3) The control at seeking operation

At the state that the spindle motor 5 is rotationally controlled at standing by, when the command of read/write is outputted from the host computer 20, the system controller 3 refers UTOC stored in the memory circuit 13 to convert the logical block address added the command into the address of track number, cluster number, and sector number. Further, the system controller 3 makes the optical pickup 8 seek to the recording position specified by the track number, cluster number, and sector number, and records or reproduces the data D1 which is inputted/outputted between the host computer 20 and the system controller 3.

At this time, the system controller 3 supplies the control command to the servo switching circuit 18, and controls to output the frequency difference signal FD to the spindle servo circuit 4. More specifically, the system controller 3 detects the target recording position, and successively stepwise supplies the rotational frequency information FR of the frequency corresponding to the recording position to the frequency comparing circuit 19. Here, because the servo switching circuit 18 outputs the frequency difference signal FD, the rotation of the spindle motor 5 is controlled in accordance with the frequency difference signal FD.

Further, the system controller 3 controls the sending motor 7 at the same time to move the optical pickup 8 toward the target track. Then, when it is detected that the optical pickup 8 has been moved to the target track based on the output of a traverse counting circuit 23, the system controller 3 controls the servo switching circuit 18 to perform the spindle servo by the rotational speed information FS.

Thus, the optical disk apparatus 1 switches successively stepwise the rotational speed of the optical disk 2 to the rotational speed corresponding to the seek target position, thereafter, controls the rotational speed of the optical disk 2 at the seek target position based on the rotational speed information FS obtained from the optical disk 2.

Figure 2:
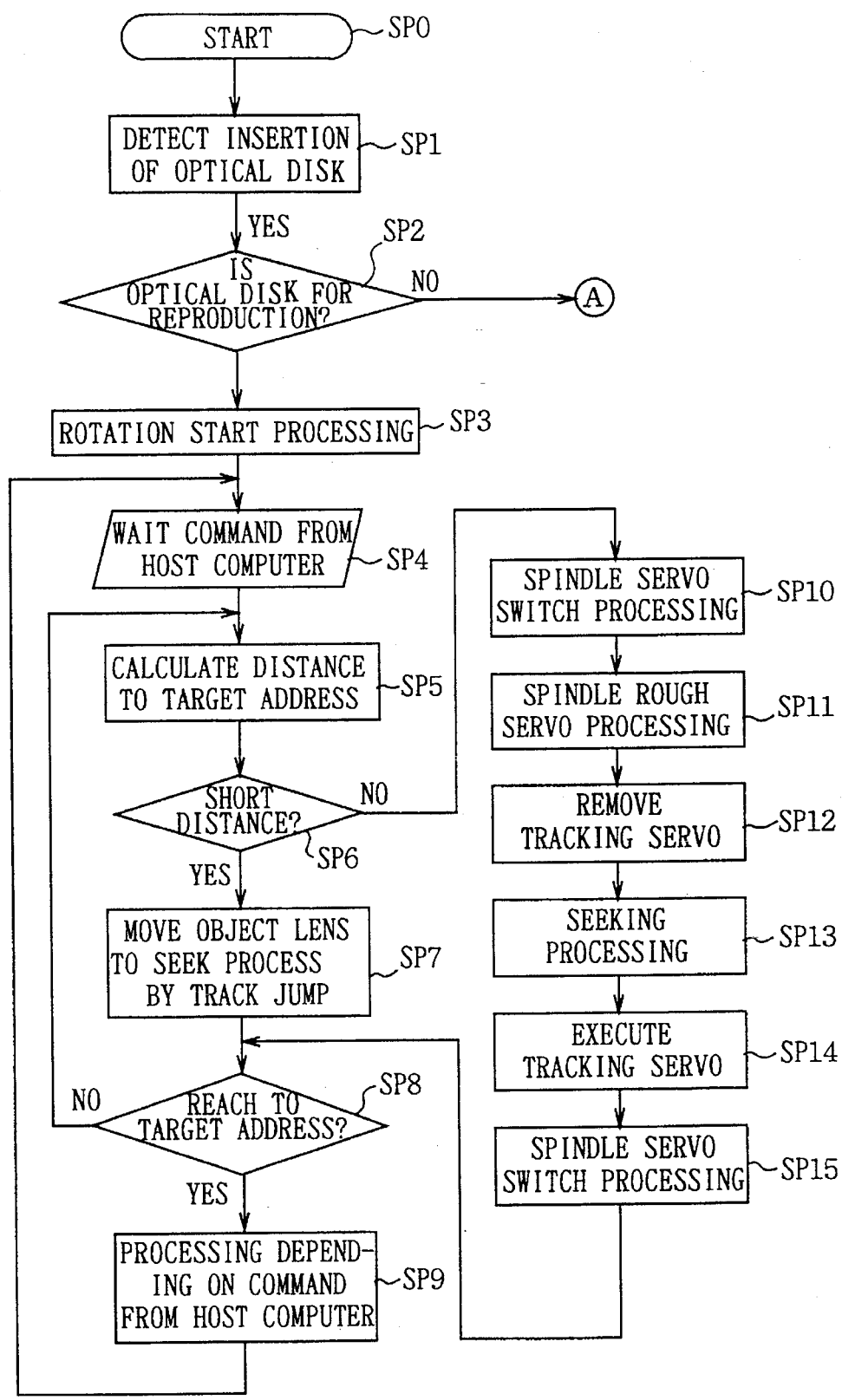
FIGS. 2 and 3 are flowcharts explaining the seeking operation in the optical disk apparatus.
Figure 3:
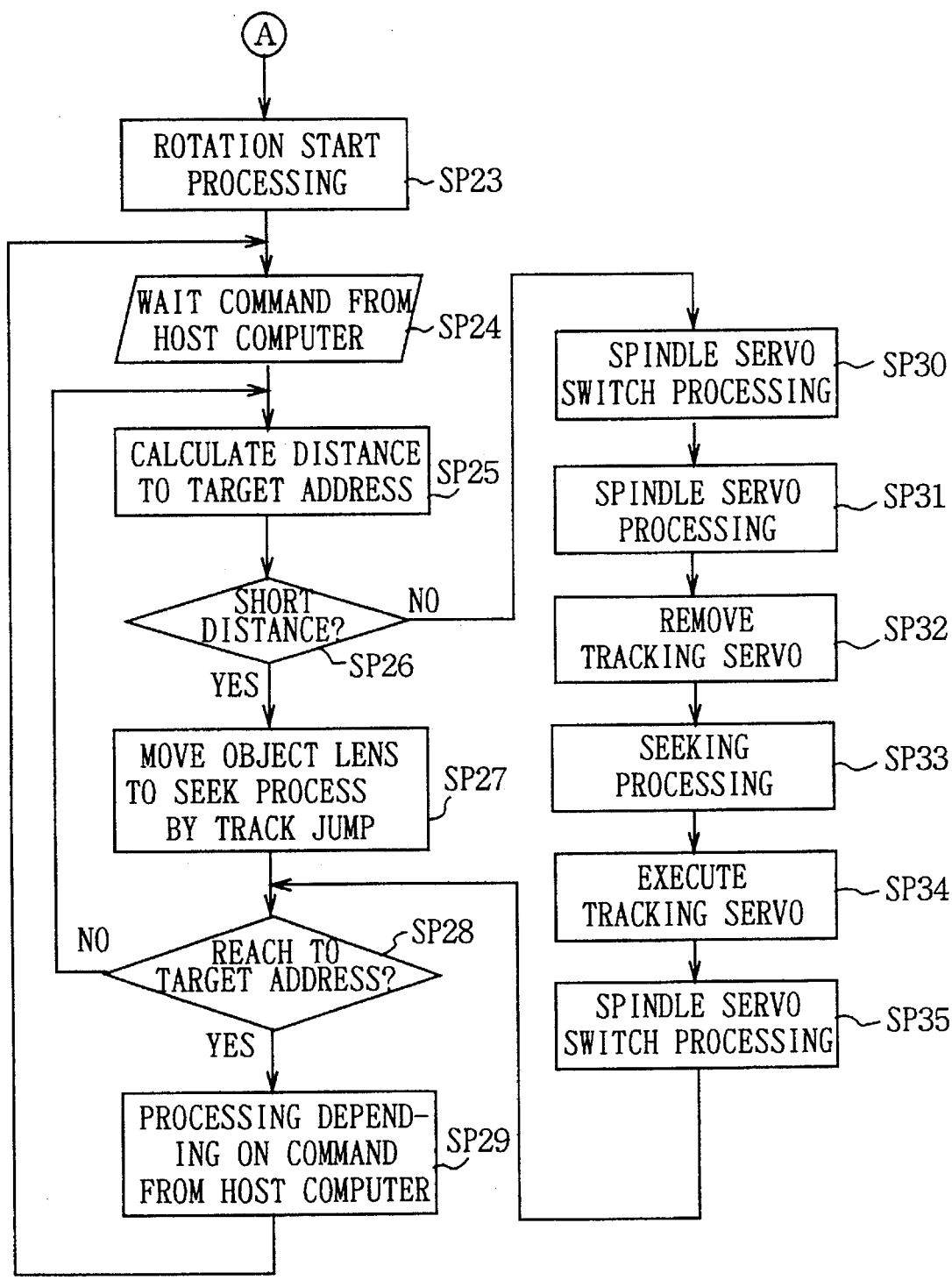

In the optical disk apparatus of the embodiment, the control of the spindle motor at seeking operation described above is realized by executing the optical disk servo procedure SP0 as shown in FIGS. 2 and 3 by the system controller 3. That is, the system controller 3 enters step SP1 from the optical disk servo procedure SP0 to detect the insertion of the optical disk 2.

When the optical disk 2 is actually inserted, the procedure proceeds to step SP2 and judges whether or not the type of optical disk 2 is for reproduction only. The judgment is performed by detecting ID hole of a cartridge in which the disk is inserted by push switch. Here, if an affirmative result is obtained, the system controller 3 proceeds to step SP3, rotates the spindle motor 5 and executes focus servo as a rotation starting processing, obtains the rotational speed information FS of the optical disk 2 from the reproduction EFM signal obtained from the result, and executes spindle servo and tracking servo to proceed to step SP4.

In the explanation of format of optical disk, type of optical disk 2 is distinguished based on the TOC data obtained by reproducing the read-in area of the optical disk. However, here, as a method for distinguishing type of optical disk 2 as earlier step as possible, ID hole of a cartridge is detected and reads the TOC data in the rotation starting processing of step SP3 to confirm. In addition, type of optical disk 2 can be distinguished based on only the TOC data obtained by reproducing the read-in area of the optical disk. In this case, the processing of step SP2 described above is switched with the processing of step SP3.

At step SP4, the system controller 3 becomes the waiting state for command from the host computer 20. At this state, when the read or write command outputted from the host computer 20 is inputted, the system controller 3 proceeds to step SP5 to calculate the distance to the target address, that is the distance necessary for seeking operation as track number and step number, and proceeds to next step SP6.

At step SP6, it is detected whether or not the distance to the target address is close, and if it is close, proceeds to next step SP7 and controls the optical pickup 8 to perform the seeking processing by track jump, and proceeds to next step SP8 to judge whether or not to reach the target address. Here, if a negative result is obtained, the procedure returns to step SP5 to perform the processing after step SP6 again.

Also, if the system controller 3 obtains an affirmative result at step SP8, proceeds to next step SP9 to execute the processing in accordance with the command from the host computer 20, thereafter, returns to step SP4 to wait the next command from the host computer 20.

Further, if the system controller 3 obtains a negative result at step SP6 described above, proceeds to step S10 to perform the spindle servo switching processing. That is, the system controller 3 controls the servo switching circuit 18 to switch the signal source of the spindle servo 4 from the rotational speed information FS consisting of EFM signal to the frequency difference signal FD obtained by comparing the frequency signal FG of the spindle motor 5 with the reference signal FR of the spindle motor 5 at the frequency comparing circuit 19.

Next, the system controller 3 proceeds to step SP11 to change stepwise the reference signal FR of the spindle motor 5 so as to become the disk rotation number at target address, as the spindle rough servo processing. Then, the system controller 3 proceeds to step SP12 to remove tracking servo, and at next step SP13, controls the sending motor 7 to move the whole optical pickup 8 and performs seek processing.

The system controller 3 counts up the track number that the optical pickup 8 has been traversed based on the counted result of the traverse count circuit 23 at seeking. When target is reached, the system controller 3 proceeds to next step SP14 to perform tracking servo, and performs spindle servo switch processing at next step SP15. More specifically, the system controller 3 controls the servo switching circuit 18 to change the signal source of spindle servo 4 to rotational speed information FS comprising EFM signal, and then returns to step SP8.

If a negative result is obtained at step SP2 described above, that is, if the optical disk 2 is recordable and reproducible magneto-optical disk, the system controller 3 proceeds to step SP23, and performs the processing of steps SP24 to SP35. At this time, as shown that 20 is added to step numbers of corresponding portion to the above steps SP3 to SP15, the difference point is the processing of steps SP23 and SP30, and is only whether the disk rotating information is obtained from EFM signal or from wobbling signal.

(2-4) Effect of first embodiment

According to the embodiment, in seeking, the rotational speed of the optical disk 2 is successively stepwise switched to the rotational speed corresponding to the seed target position, thereafter, the rotational speed of optical disk 2 is controlled based on the rotational speed information FS obtained from the optical disk 2 at seek target position, so as to shorten the time necessary for seek.

(3) Optical disk apparatus of second embodiment

Figure 4:
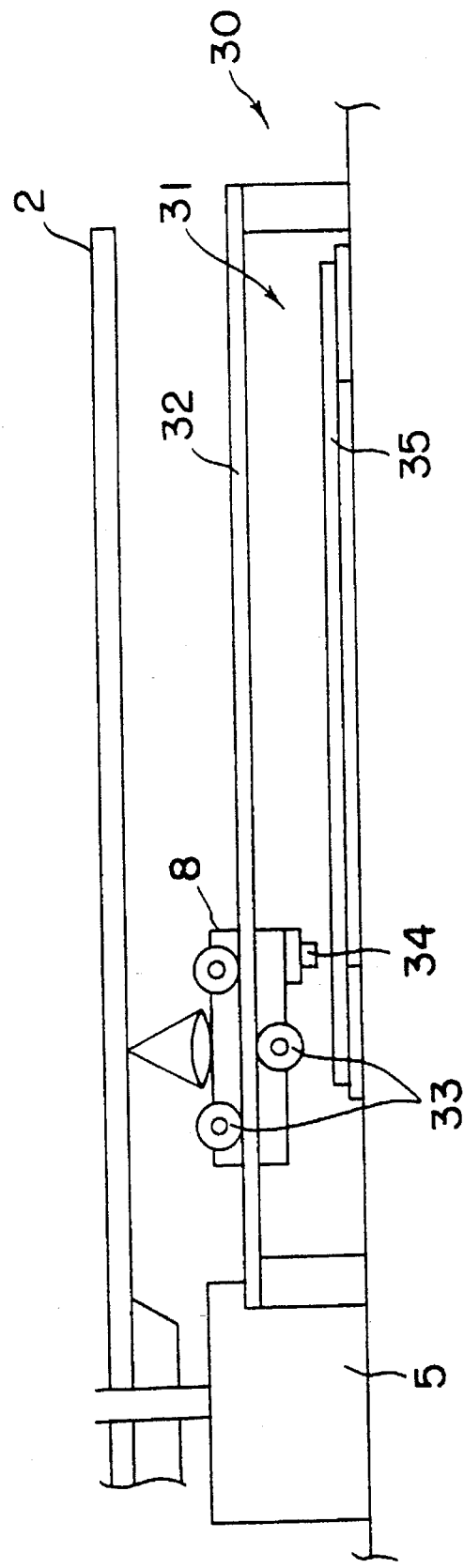
FIG. 4 is a side view explaining the second embodiment of the optical disk apparatus according to this invention.

In FIG. 4, 30 shows the optical disk apparatus according to the second embodiment. In this embodiment, the position of the optical pickup 8 is detected by position detecting means 31, and in seeking, the rotational speed of the optical disk 2 is controlled based on the position detected result. In this embodiment, a guide bar 32 is supported parallel to the optical disk 2 in the radial direction of optical disk 2 which is rotationally driven by the spindle motor 5, and the optical pickup 8 is provided on the guide bar 32 through a roller bearing 33. Therefore, the optical pickup 8 can move to the desired recording position following to the guide bar 32 by driving the sending motor 7 (FIG. 1).

Further, in the optical pickup 8, a light emitting diode 34 is positioned on the bottom plane of base side, and a position detecting element 35 which is positioned parallel to the guide bar 32 detects the light of the light emitting diode 34. Therefore, the position of optical pickup 8 is detected.

In this embodiment, the system controller 3 drives the servo circuit, in waiting and in recording and reproducing data, as the same as the first embodiment. The system controller 3 holds the spindle motor 5 to the predetermined rotational speed at waiting, and simultaneously holds the optical pickup 8 to the position accessed finally, and rotationally drives the spindle motor 5 based on the rotational speed information FS obtained from the optical disk 2.

On the contrary, in seeking, the system controller 3 detects the position of optical pickup 8 based on the position detected result of the position detecting element 35, and outputs the rotational speed of the optical disk 2 corresponding to each position to the servo switching circuit 18 as the control target of spindle motor 5. Therefore, the optical disk apparatus 30 outputs the control target of the spindle motor 5 so that the rotational speed of spindle motor 5 changes following the movement of the optical pickup 8, and the spindle servo circuit 4 rotationally drives the spindle motor 5 based on the rotational speed information FG so as to become the control target.

If the optical pickup 8 moves to the target position even in the above way, the rotational speed of the spindle motor 5 can be held to almost the target speed, and the time necessary for seek can be shortened.

With the above constitution, by making the rotational speed corresponding to the position of the optical pickup 8 to be the control target, the spindle motor 5 is controlled at seeking, so that the same effect as the first embodiment can be obtained.

(4) Other embodiments

The embodiment discussed above have dealt with the case where the optical pickup is held to the access end position. However, this invention is not only limited to this, but the optical pickup may be held to the predetermined position of recordable area, and may seek from this position.

The embodiment discussed above have dealt with the case where the spindle motor is rotationally controlled at waiting based on the rotational frequency signal that the signal level becomes high whenever the spindle motor rotates at predetermined angle. However, this invention is not only limited to this, but the spindle motor may be rotationally controlled at waiting based on the rotational reference signal that the signal level becomes high when the spindle motor makes one revolution.

Further, this invention is not only limited to the case where the spindle motor is rotationally controlled based on the rotational speed, but in the case that the rotational speed of spindle motor is determined with only one selection for the impressed voltage, the spindle motor may be rotationally controlled by forming open loop control circuit.

Further, in the case where the optical pickup is driven in the radial direction of magneto-optical disk by using the stepping motor as the sending motor, the optical disk may be rotationally driven based on the driving pulse number consisting of driving information of stepping motor.

The embodiment discussed above have dealt with the case where the optical disk in which the recording track is formed spirally is recorded and reproduced. However, this invention is not only limited to this, but is widely applicable to the case that the optical disk in which the recording track is formed like a concentric circle.

Industrial Applicability

This invention is applicable to an optical disk apparatus for recording and/or reproducing a predetermined data on/from an optical disk, especially, rotated by constant linear velocity system.

I claim:

1. An optical disk apparatus for recording and/or reproducing a desired data by rotationally driving a disk recording medium under constant linear velocity, comprising:

rotational driving means for rotationally driving said disk recording medium;

first rotational speed information detecting means for detecting the rotational speed of said disk recording medium based on said rotational driving means and outputting a first rotation driving signal;

optical pickup means for irradiating a light beam to said disk recording medium to record and/or reproduce said data on/from said disk recording medium;

optical pickup moving means for moving said optical pickup means in the radial direction of said disk recording medium;

second rotational speed information detecting means for detecting the rotational speed of said disk recording medium based on said data reproduced by said optical pickup means, and outputting a second rotational speed information;

servo switching means for selectively supplying said first rotational speed signal or said second rotation speed information to said rotational driving means;

optical sensor means for optically detecting the movement of said optical pickup means; and control means for switching said servo switching means at seek operation to control the rotational speed of said rotational driving means based on said first rotational speed signal, and when it is detected that said optical pickup means have been moved to the target position by the output of said optical sensor means, switching said servo switching means to control the rotational speed of said rotational driving means based on said second rotational speed signal.

2. The optical disk apparatus according to claim 1, wherein said control means, when controlling the rotational speed of said rotational driving means based on said first rotational speed signal, rotationally drives said disk recording medium at rotational speed corresponding to the position detected by said position detecting means, until it is detected that said optical pickup means has been moved to the target position.

3. An optical disk apparatus for recording and/or reproducing desired data by rotationally driving a disk recording medium under constant linear velocity, comprising:

rotational driving means for rotationally driving said disk recording medium;

first rotational speed information detecting means for detecting the rotational speed of said disk recording medium based on said rotational driving means and outputting a first rotation driving signal;

optical pickup means for irradiating a light beam to said disk recording medium to record and/or reproduce said data on/from said disk recording medium;

a stepping motor for moving said optical pickup means in the radial direction of said disk recording medium;

second rotational speed information detecting means for detecting the rotational speed of said disk recording medium based on said data reproduced by said optical pickup means, and outputting a second rotational speed information;

servo switching means for selectively supplying said first rotational speed signal or said second rotation speed information to said rotational driving means;

position detecting means for detecting the position of said disk recording medium of said optical pickup means in the radial direction; and control means for switching said servo switching means at seek operation to control the rotational speed of said rotational driving means based on said first rotational speed signal, and when it is detected that said optical pickup means have been moved to the target position by the output of said position detecting means, switching said servo switching means to control the rotational speed of said rotational driving means based on said second rotational speed signal.

4. The optical disk apparatus according to claim 3, wherein said position detecting means detects the position of said optical pickup means based on the signal for driving of said stepping motor supplied to said optical pickup moving means.

5. The optical disk apparatus according to claim 1, wherein said control means calculates a distance to a target position and switches said servo switching means at seek operation if said distance is greater than a predetermined distance.

6. The optical disk apparatus according to claim 3, wherein said control means calculates a distance to a target position and switches said servo switching means at seek operation if said distance is greater than a predetermined distance.

* * * * *